Patented Oct. 17, 1950

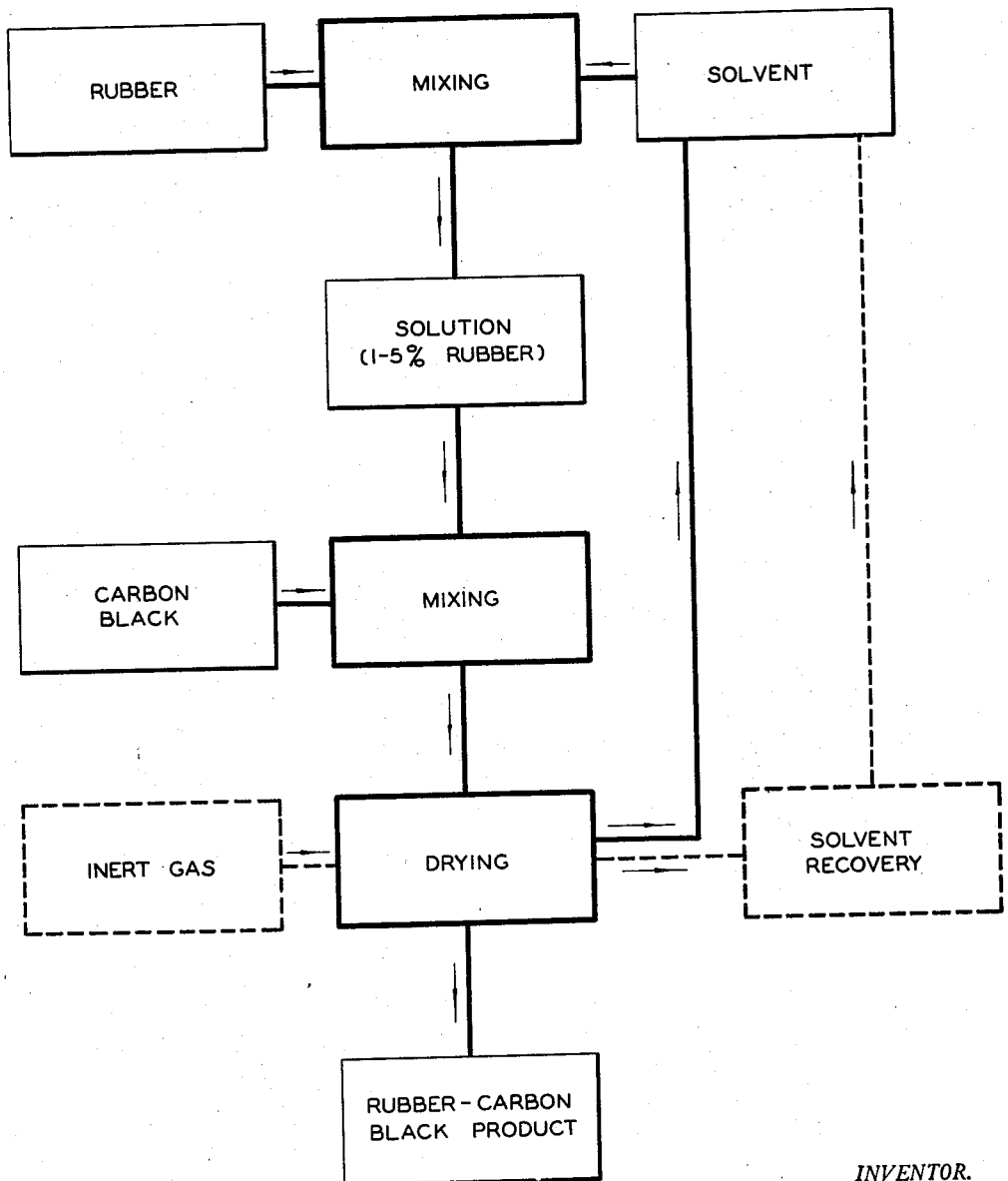

2,526,120

UNITED STATES PATENT OFFICE 2,526,120

PELLETING CARBON BLACK

Willie W. Crouch, Bartlesville, Okla., assignor to Phillips Petroleum Company, a corporation of Delaware Application January 21, 1946, Serial No. 642,448

13 Claims. (Cl. 260—41.5)

This invention relates to a process for the agglomeration of carbon black and to apparatus for carrying out the process. In one of its more specific aspects the present invention relates to the agglomeration of carbon black with a solution of rubbery material to form a pelleted product.

Carbon black is produced by the thermal decomposition of hydrocarbons. Many processes are known and used in its production. These processes produce a wide variety of types and grades of this particular form of carbon. Two types of processes are widely used for the production of most carbon black. One is the so-called "channel" process in which hydrocarbon gas is burned in luminous flames which impinge on cool steel beams or "channels." The finely divided particles of carbon, similar in appearance to soot, are scraped from the channels and, after compacting into a more dense form, packaged for shipment. Rotating plates are sometimes employed in place of channels as collecting surfaces for the carbon. The other process which is rather widely used is the so-called "furnace" process in which a hydrocarbon gas or oil is decomposed by heating to a temperature at which free carbon is liberated in a finely divided amorphous state. The flocculent carbon so produced is collected, compacted, and packaged for shipment. Other processes are used for the production of special blacks for particular uses.

Carbon black is used as a pigment and as a compounding ingredient in the manufacture of rubbery material. The major proportion of the carbon black produced is used in the manufacture of rubber goods. Carbon black imparts desirable abrasion resistance to rubber goods and is widely used for this purpose, almost exclusively, in the manufacture of tires for vehicles. In the compounding of rubbery material with carbon black, the black must be highly dispersed in the rubber. Conventionally, the dispersion is accomplished by mixing the rubber with carbon black by kneading in a Banbury or by milling on rolls. Carbon black in powdered form liberates a large quantity of dust in these mixing operations. This dust is an annoyance and a hazard to workmen and, in addition, a contaminant to white or colored rubber goods which may be processed in the same building. To reduce the dust problem in handling and using carbon black, it is now customary to form the raw carbon black into small pellets or briquettes which have a higher bulk density than the carbon black as initially produced and which are substantially dustless in character. Commercial pellets vary in size from about one-thirty second to about three-eighths inch in diameter.

In the compounding of natural rubber, carbon black produced by the channel process is generally preferred; with synthetic rubber, on the other hand, carbon black produced by the furnace process is preferred. The present process may be employed for pelleting either of these widely used carbon black products.

Throughout this specification, the term "pelleting" is used in its broadest sense to designate the agglomeration of powdered material into larger particles, regardless of the process by which the agglomeration is effected or the nature of the particle produced. The term "pellet" is used to designate the agglomerate particle.

The term rubbery material when used herein covers such rubbery materials as natural rubber and butadiene-styrene copolymers.

Carbon black, as initially produced is a finely divided flocculent powder having an apparent bulk density of about 3 pounds per cubic foot. It may be densified by mechanical agitation to give a powder having a bulk density of about 12 pounds per cubic foot. The densifying operation apparently reduces the quantity of air or other gases associated with the carbon black without appreciable agglomeration of the carbon black particles. The density may be further increased by mechanical agitation of the dry carbon black or by imparting a rolling motion to the carbon black particles. This operation forms agglomerates or pellets of carbon black resulting in particles ranging in size from about 8 mesh to about 100 mesh. Particles larger or smaller in size may be formed, but in general the foregoing range represents the desirable limits. Preferably the carbon black particles so formed are about 10 mesh in size, or within the range of about 8 mesh to about 40 mesh. Dry pelleting of carbon black has proven very satisfactory for channel blacks, but is less useful for pelleting of soft blacks, or furnace blacks.

Carbon blacks may be pelleted by any of the so-called wet pelleting processes. There are two methods of wet pelleting in general use. In one, the raw carbon black is admixed with sufficient water to form a paste, extruded through dies and broken into columnar segments. The other method involves wetting of a portion of the raw carbon black, preferably with a fine spray, while subjecting the carbon black to mechanical agitation which agglomerates the carbon black. Pellets formed by either of these methods are subjected to a drying operation to remove the water therefrom prior to packaging and shipping.

Another method of increasing the bulk density of carbon black prior to shipping is used to some extent, particularly for soft blacks or furnace blacks. By this method the carbon black is first predensified as described hereinbefore to a bulk density of about 12 pounds per cubic foot and the predensified carbon black is then compressed into a cake having a bulk density of about 25 pounds per cubic foot. Often the predensified black is put in shipping containers, paper bags, for example, prior to the compressing operation. Prior to use, the cake of carbon black must be disintegrated. The bagging, compressing, and disintegrating operations cause large amounts of carbon black dust to be liberated, making these operations disagreeable for the operators.

The present invention provides a process for the production of small discrete particles or pellets of carbon black intimately dispersed in rubbery material. These particles or pellets are of substantially uniform size, are dustless in character, and possess the desirable characteristic of being readily dispersible in rubbery material in compounding operations. The product has high mechanical strength, resists crushing under normal shipping conditions, yet is readily broken down and dispersed by milling. In accordance with this invention carbon black is admixed with a solution of rubbery material. Either natural or synthetic rubber may be used; the choice is determined primarily by the ultimate use of the carbon black. For example, a soft furnace black preferred for the compounding of synthetic rubber is preferably dispersed in synthetic rubber by the process of this invention. Any suitable solvent may be employed in making up the solution of rubbery material.

In accordance with this invention, a dilute solution of raw natural or synthetic rubber in a suitable solvent is prepared. The flocculent carbon black to be pelleted is contacted with the solution of rubbery material. The pellets may be formed in various ways as more fully disclosed hereinafter. Carbon black is admixed with the solution of rubbery material, which wets the carbon black, and forms an intimate mixture of carbon black and rubbery material. The solvent is then evaporated to give as product small, discrete particles of carbon black intimately admixed with rubbery material. The product is stable, free flowing, and substantially dustless. The product contains considerably less rubbery material than is used in the formulation of finished rubber goods. In most instances it is preferable by the present process to use only sufficient rubbery material to bind the carbon black into stable, dustless discrete particles.

An object of this invention is to provide a process for pelleting carbon black. Another object is to provide a process for forming small discrete particles of carbon black intimately dispersed in rubbery material. Another object is to provide such a process in which a solution of rubbery material is used as a binder for the carbon black. Other objects and advantages will be apparent to those skilled in the art.

The drawing is a schematic flow diagram illustrating the process of the present invention.

By the process of my invention, a solution of rubbery material in a suitable solvent is first prepared. Either crude natural rubber or any of the various synthetic rubbers, preferably GR-S or a similar type, may be employed. As solvent, benzene and carbon tetrachloride are suitable although any of various other solvents for rubbery material may be used. Preferably, the solvent employed is a low-boiling, volatile organic solvent which may be readily evaporated with little expense and recovered for recycling to the process. The proportions of rubbery material and solvent are variable; preferably the proportions are such as to give a solution containing from about 1 to about 5 weight per cent rubbery material in the solution. This solution is free flowing and may be pumped and sprayed in conventional apparatus. The rubbery material which is used as a bonding agent is incorporatable in the final product, and is in fact preferably the same rubbery material as that used in the product. Any desired quantity of the rubbery material binder may, therefore, be used with impunity.

The solution of rubbery material may be admixed or brought into contact with the carbon black in a number of ways. This solution may be used as the wetting agent, instead of water, in a so-called wet pelleting process. It has the advantage of providing an effective binder for the carbon black to produce more stable pellets than may be produced using water alone as a binder. Since the solvent is volatile, it may be evaporated readily from the finished product.

It has been proposed to use latex as a wetting medium in pelleting carbon black. Latex makes satisfactory pellets, but presents a drying problem. The water must be evaporated from the pellet which is somewhat more difficult than the evaporation of a volatile organic solvent as employed in my process. Synthetic latex contains an emulsifying agent, usually soap, which remains in the pelleted product and which may be an undesirable contaminant in some classes of rubber goods.

Pellets, or small discrete particles of carbon black intimately admixed with rubbery material, may be formed by the process of my invention by contacting the solution of rubbery material in the form of droplets with flocculent carbon black. The carbon black may be in bulk form, as for example, spread on a moving conveyor. In a preferred form the solution of rubbery material is contacted with the carbon black by spraying into an agitated mass of carbon black or a gaseous dispersion of flocculent carbon black. The droplets of solution of rubbery material wet small portions of carbon black to form small masses of wet carbon black more or less spherical in form. Agitation of the resulting heterogeneous mixture of dry carbon black and globules of carbon black wet with the solution of rubbery material aids in the formation of spherical pellets. Upon evaporation of the solvent, uniform, free-flowing particles of carbon black dispersed in and bonded by rubbery material are obtained. Various forms of apparatus may be employed in carrying out the pelleting in this manner. A number of patents have issued on apparatus of this nature in which water is used as the wetting agent. Apparatus which may be used for pelleting with water is generally suitable for use in pelleting carbon black with a solution of rubbery material in accordance with my invention.

The solution of rubbery material may be admixed with carbon black to form a paste which can then be formed into pills or pellets by suitable apparatus. Here again, apparatus for pelleting carbon black with water as a wetting agent may be employed with the solution of rubbery material in accordance with my invention. One of the preferred ways of carrying out this type of pelleting is to admix the carbon black with the rubber cement to form a paste, extrude the paste through a die to form rods about one-eighth inch in diameter, and breaking these rods into short columnar segments about one-eighth inch in length. After evaporation of the solvent, the resulting product, which retains its size and shape, is hard, stable, and dustless. The columnar segments of carbon black bonded with rubbery material may be tumbled before or during the drying or solvent removal operation. It is a peculiar characteristic of the product produced in accordance with my invention that any pieces broken from the columnar segments in handling, e. g. tumbling, retain their dustless characteristics, whereas in conventional processes using water as the wetting medium these pieces, when dry, immediately revert to the objectionable dusty state.

In the drying operation it is preferable to employ a heated gas to accomplish the solvent evaporation. Carbon dioxide, nitrogen, flue gases, and the like, which are inert to the solvent, are most suitable as the gas used for drying. The small particles of carbon black and rubbery material formed by my process may be contacted with the heated gas in stationary beds through which the gas is passed, but preferably are contacted with the gas while agitated by rolling or tumbling. It is advantageous to pass the gas in a direction countercurrent to the direction of mass flow of the product. This is conveniently carried out in a revolving cylinder with the pellets fed in at one end of the cylinder and the hot gases supplied at the opposite end. The pellets are rolled circumferentially within the cylinder while moving from one end to the other therethrough and are brought into intimate contact with the gases passing through the cylinder in the opposite direction. Apparatus of this type is known in the art.

The gases are preferably heated to a temperature of about 200° F. As is well known, the rate of evaporation increases, as the temperature of the gas is increased. The gas temperature must, however, be kept below that at which the quality of the rubber material binder is seriously impaired. Solvent may be recovered from the carbon black-rubbery material product in any suitable manner. Where the solvent is vaporized in relatively pure state from the product, it need only be condensed and returned to the mixing zone in which the solution is made up. However, when a gas is used to aid in the drying, it is desirable to separate the solvent from the gas to prevent losses. This separation may be effected by well known methods of solvent recovery, for example, by condensation of the solvent from the gas, by selective absorption or adsorption of the solvent, or by a combination of these steps.

In a preferred modification of my invention the product is made in a novel manner. A dilute solution of rubbery material is prepared, preferably having a rubbery material content of from 2 to 4 per cent by weight. This is then mixed with carbon black to form a paste, using from 35 to 45 parts of carbon black by weight per 100 parts of solution. A three per cent solution of rubbery material admixed with 40 parts of carbon black per 100 parts of solution is very satisfactory. The paste so formed is then extended and the solvent evaporated. The extension and evaporation of solvent may be accomplished in various ways. One method of extension is by kneading in a mixer, for example in a Banbury mixer, with concomitant evaporation and removal of solvent.

Another method of extension is by spreading the paste in a thin film or sheet on a conveyor belt or in trays and evaporating the solvent from the sheet. By any of these methods, the paste upon evaporation of solvent, breaks up into small discrete particles in the form of granules. The product so produced is stable, free-flowing, and dustless.

The following examples illustrate various embodiments of the present invention. These examples are illustrative only and are not to be considered as limiting the invention.

*Example 1*

Standard GR-S, a copolymer prepared by the polymerization of 75 parts by weight of 1,3-butadiene and 25 parts by weight of styrene in an aqueous emulsion, was dissolved in benzene to form a 2 per cent (by weight) solution of rubbery material. This solution was contacted with flocculent carbon black spread in a thin layer using a nozzle to produce small droplets of the solution. The carbon black was readily wet by the solution. Each droplet formed a bead or pellet of carbon black wet by the rubber solution. After evaporation of the benzene the pellets were hard, free-flowing, and dustless.

*Example 2*

A three per cent by weight solution of a GR-S copolymer was prepared using benzene as solvent. This solution was admixed with flocculent carbon black to make a thick paste using 12 parts of carbon black by weight and 30 parts solution of rubbery material. The paste was spread in a thin sheet and dried at 140° F. The sheet cracked on drying into a myriad of small granules. The granules were discrete particles of carbon black dispersed in rubbery material. These particles were firm, free-flowing, and dustless. They were readily dispersed in GR-S in standard milling operations.

It will be evident to one skilled in the art that the process of my invention may be carried out in a number of ways and is not limited by the foregoing detailed disclosure. Various modifications of apparatus and procedure are within the scope of the invention disclosed herein and may be employed without departing from the spirit of my invention.

I claim:

1. A process for forming small discrete agglomerates of carbon black intimately admixed with a rubbery material which comprises admixing a solution in benzene of a rubbery material selected from the group consisting of natural rubber and butadiene-styrene copolymers containing from 2 to 4 weight per cent of said rubbery material with from 35-45 parts carbon black by weight per 100 parts of said solution, evaporating the benzene from the resulting admixture and recovering agglomerates of carbon black and rubbery material as a product of the process.

2. A process for forming small discrete agglomerates of carbon black intimately mixed with a rubbery material which comprises admixing a solution in benzene of a rubbery material selected from the group consisting of natural rubber and a butadiene-styrene copolymer containing approximately 3 weight per cent of said rubbery material with 40 parts carbon black by weight per 100 parts of said solution, evaporating benzene from the resulting admixture whereby agglomerates of carbon black bonded by said rubbery material are formed, and recovering said agglomerates as a product of the process.

3. A process for forming small discrete agglomerates of carbon black intimately admixed with a rubbery material which comprises admixing a solution of rubbery material selected from the group consisting of natural rubber and a butadiene-styrene copolymer containing from 2 to 4 weight per cent of said rubbery material in a volatile organic solvent selected from the group consisting of benzene and carbon tetrachloride with from 35 to 45 parts carbon black by weight to form a paste, extending said paste, evaporating solvent therefrom whereby agglomerates of carbon black and said rubbery material are formed, and recovering said agglomerates as a product of the process.

4. A process for forming small discrete agglomerates of carbon black intimately admixed with a rubbery material which comprises admixing a solution of rubbery material selected from the group consisting of natural rubber and a butadiene-styrene copolymer containing from 2 to 4 weight per cent of said rubbery material in a volatile organic solvent selected from the group consisting of benzene and carbon tetrachloride with from 35 to 45 parts carbon black by weight to form a paste, spreading this paste in a thin sheet, evaporating solvent from said sheet whereby said sheet breaks up into agglomerates of said rubbery material and carbon black, and recovering the agglomerates as a product of the process.

5. A process for forming small discrete agglomerates of carbon black dispersed in a rubbery butadiene-styrene copolymer material which comprises admixing a 3 per cent by weight solution in benzene of said rubbery material with 40 parts carbon black by weight per 100 parts solution to form a paste, extending said paste by spreading same in a thin sheet, evaporating solvent from said sheet whereby said sheet breaks up into finely-divided agglomerates of carbon black and said rubbery material, and recovering said agglomerates as a product of the process.

6. A process for the agglomeration of carbon black which comprises admixing a solution of 1 to 5 weight per cent of a rubbery material selected from the group consisting of natural rubber and butadiene-styrene copolymer in a solvent selected from the group consisting of benzene and carbon tetrachloride with carbon black, evaporating solvent from the resulting admixture and recovering carbon black admixed with said rubbery material as the agglomerated product of the process.

7. A process for forming small discrete agglomerates of carbon black dispersed in natural rubber which comprises admixing a 3 per cent by weight solution of said rubber in benzene with 40 parts carbon black by weight per 100 parts solution to form a paste, extending said paste and spreading same in a thin sheet, evaporating solvent from said sheet whereby finely-divided agglomerates of carbon black in rubber are formed, and recovering these agglomerates as the product of the process.

8. A process for forming small discrete agglomerates of carbon black dispersed in a rubbery butadiene-styrene copolymer material which comprises admixing a 3 per cent by weight solution in carbon tetrachloride of said rubbery material with 40 parts carbon black by weight per 100 parts solution to form a paste, extending said paste by spreading same in a thin sheet, evaporating solvent from said sheet whereby said sheet breaks up into finely-divided agglomerates of carbon black and said rubbery material, and recovering said agglomerates as a product of the process.

9. A process for forming small, free-flowing dustless agglomerated pellets of carbon black intimately admixed with a rubbery material which comprises spraying a solution of 1 per cent to 5 per cent by weight of a rubbery material selected from the group consisting of natural rubber and butadiene-styrene copolymer dissolved in a solvent selected from the group consisting of benzene and carbon tetrachloride on flocculent carbon black spread in a thin layer, evaporating the solvent and recovering the resultant agglomerated pellets.

10. A process for forming small free-flowing, dustless agglomerates of carbon black intimately admixed with a rubbery material which comprises spraying a solution of 2 per cent by weight of a copolymer prepared by the polymerization of 75 parts by weight of 1,3 butadiene and 25 parts by weight of styrene in an aqueous emulsion, dissolved in benzene on flocculent carbon black spread in a thin layer, evaporating the benzene and recovering the resultant agglomerated pellets.

11. A process for forming small free-flowing, dustless agglomerates of carbon black intimately admixed with a rubbery material which comprises spraying a solution of 2 per cent by weight of a copolymer prepared by the polymerization of 75 parts by weight of 1,3 butadiene and 25 parts by weight of styrene in an aqueous emulsion, dissolved in carbon tetrachloride on flocculent carbon black spread in a thin layer, evaporating the benzene and recovering the resultant agglomerated pellets.

12. A process for forming small free-flowing, dustless agglomerates of carbon black intimately admixed with a rubbery material which comprises spraying a solution of 2 per cent by weight of natural rubber, dissolved in benzene on flocculent carbon black spread in a thin layer, evaporating the benzene and recovering the resultant agglomerated pellets.

13. A process for forming small free-flowing, dustless agglomerates of carbon black intimately admixed with a rubbery material which comprises spraying a solution of 2 per cent by weight of natural rubber, dissolved in carbon tetrachloride on flocculent carbon black spread in a thin layer, evaporating the benzene and recovering the resultant agglomerated pellets.

WILLIE W. CROUCH.

REFERENCES CITED

The following references are of record in the file of this patent:

UNITED STATES PATENTS

| Number | Name | Date |
|---|---|---|
| 2,002,252 | Stam | May 21, 1935 |
| 2,082,304 | Stam | June 1, 1937 |
| 2,086,997 | Stabner | July 13, 1937 |
| 2,123,482 | De Jong | July 12, 1938 |
| 2,395,507 | Sauser | Feb. 26, 1946 |
| 2,457,962 | Whaley | Jan. 4, 1949 |

FOREIGN PATENTS

| Number | Country | Date |
|---|---|---|
| 270,658 | Great Britain | Apr. 12, 1928 |